United States Patent [19]
Graham

[11] 3,739,732
[45] June 19, 1973

[54] PORTABLE CHARCOAL IGNITER

[76] Inventor: Thomas A. Graham, P. O. Box 5427, San Mateo, Calif. 94402

[22] Filed: May 24, 1971

[21] Appl. No.: 146,248

[52] U.S. Cl. ............................. 110/1 F, 126/25 B
[51] Int. Cl. ............................................. F23b 1/02
[58] Field of Search ................. 110/1 F; 126/25 B, 126/59.5

[56] References Cited
UNITED STATES PATENTS

| | | | |
|---|---|---|---|
| 1,934,339 | 11/1933 | Winberg | 110/1 F |
| 1,468,540 | 9/1923 | Miller | 126/59.5 |
| 2,120,683 | 6/1938 | Simmons | 126/25 B |
| 3,073,263 | 1/1963 | Wynkoop | 110/1 F |

*Primary Examiner*—William F. O'Dea
*Assistant Examiner*—Harold Joyce
*Attorney*—Naylor & Neal

[57] ABSTRACT

A container for receiving and igniting a quantity of charcoal. The container has an open top, a bottom and a generally perforated cylindrical vertical wall to which a carrying handle is fixed and comprises: a liquid fuel chamber with a fuel absorbent pad, the chamber defined by the bottom and an imperforate lower portion of the vertical wall and a screen mounted above the pad; a combustion chamber with an ignition wick supported on the screen, the combustion chamber defined by the screen, an apertured segment of the vertical wall, and a charcoal supporting grate; and, a perforated vertical flame channel fixed to the inside of the vertical wall above the grate to disperse ignited fuel gases to the upper reaches of charcoal contained by the remaining portion of the vertical wall.

9 Claims, 3 Drawing Figures

Patented June 19, 1973

3,739,732

INVENTOR.
THOMAS A. GRAHAM
BY Naylor & Neal

ATTORNEYS

PORTABLE CHARCOAL IGNITER

BACKGROUND AND SUMMARY OF THE INVENTION

Portable containers for igniting charcoal or charcoal briquets that are subsequently transferred to a barbecue or grill are not new in the art. However, previous devices have failed to provide efficient ventilating means for rapid and uniform ignition of the entire quantity of charcoal desired to be started. The present charcoal igniter provides a rapid means of uniformly igniting a quantity of charcoal placed in a portable container. Three separately defined chambers in the container combine to ignite gases emitted from a liquid fuel and disperse the ignited gases throughout the quantity of charcoal received in the container.

In the preferred embodiment, the inventive igniter comprises a cylindrical container with an open top and a vertical side wall. The container is formed with a lower fuel chamber into which is poured a discrete quantity of liquid fuel such as lighter fluid or kerosene. Above the fuel chamber and separated therefrom by a screen is a combustion chamber in which the gases emitted by the liquid fuel are ignited. To maintain the fuel in close proximity to the combustion chamber a fuel absorbing pad which may be of a metallic wool is placed in the fuel chamber under the screen. In this manner the heat from the combustion chamber insures a continuous supply of ignitable gases from the fuel chamber.

Above the combustion chamber in the remaining portion of the cylindrical container is a chamber or receptacle for receiving a quantity of charcoal to be ignited. To adequately provide for ventilation in the combustion of the charcoal, the wall of the container is uniformly perforated.

The combustion chamber is separated from the charcoal receptacle thereabove by a grate which permits ignited gases to rise into the charcoal while preventing charcoal from falling into the combustion chamber. To initiate ignition of the fuel, an inconsumable ignition wick supported on the screen extends through a aperture in the wall of the container. When liquid fuel is poured into the fuel chamber from the top of the container, the wick becomes saturated with fuel and may be lighted at its outer end to initiate the combustion process.

Ventilation for the combustion process is provided by a series of apertures on the periphery of a wall segment of the container adjacent the combustion chamber.

The preferred embodiment also includes a flame channel immediately above the grate and adjacent a portion of the wall of the container in the charcoal receptacle. The flame channel provides a small fluelike passage in which rapidly emitted and ignited gases may pass to the upper reaches of the charcoal receptacle through a plurality of perforations in the wall of the channel. The flame channel also inhibits any obnoxious smoking of the portable container during the ignition process.

After initial ignition of the wick, the entire combustion chamber will be ignited in approximately a half minute. Gases entering the charcoal receptacle and emitted by the charcoal itself will ignite in one to two minutes. All the charcoal will be sufficiently ignited for transferral to a barbecue or grill in 15 to 25 minutes.

As the fuel in the fuel chamber is exhausted within this period, the charcoal in the container may be carried by a handle extending from the wall of the container, and dumped into a barbecue or grill for immediate use.

DESCRIPTION OF THE PREFERRED EMBODIMENT

Figure 1:
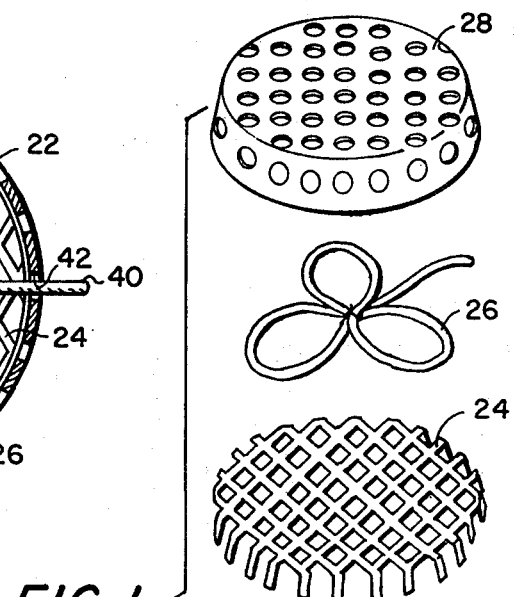
FIG. 1 is an exploded view of the charcoal igniter.

Referring in greater detail to FIG. 1, a cylindrical container 10 having an open top and a closed bottom is illustrated. The container 10 comprises a vertical cylindrical side wall 12 having an imperforate lower portion 14, an apertured intermediate segment 16 above the lower portion with a plurality of ventilation holes 18 on the periphery of the wall, and a generally perforated upper portion 20.

In the container there is placed in ascending order, a fuel absorbing pad 22, a screen 24, an inconsumable ignition wick 26 and a grate 28. Fixed to the wall of the cylindrical container is a handle 30 which in part is formed with a hand grip fabricated of a material of low thermal conductivity. Vertically mounted to the wall inside the container is an elongated perforate flame channel 32.

Figure 2:
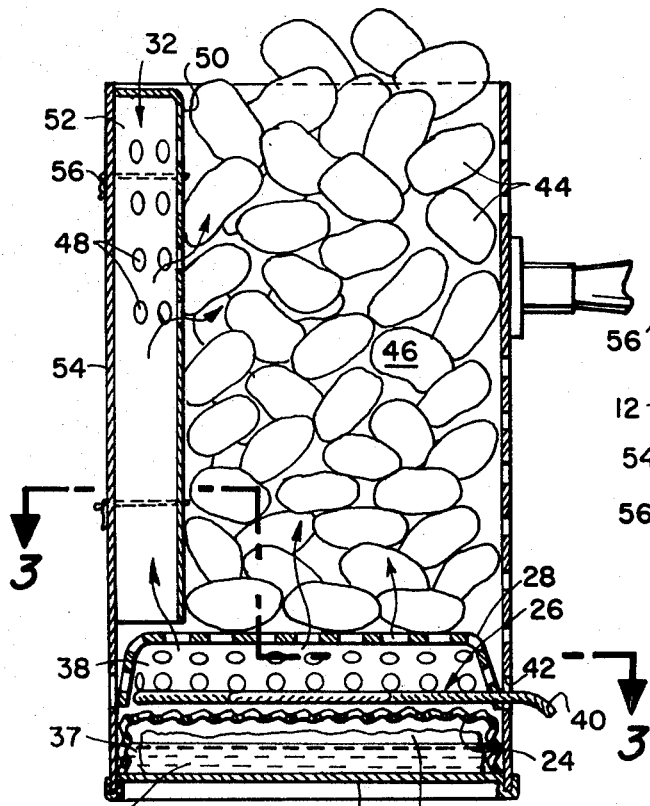
FIG. 2 is a sectional view of the charcoal igniter containing a quantity of charcoal.

The particular arrangement of the above elements in the container is illustrated with greater clarity in FIG. 2. From this figure it can also be seen that the bottom of the container is formed with an imperforate base plate 34. The base plate 34 and imperforate lower portion 14 of the vertical wall form a fuel chamber 36.

The fuel absorbing pad 22, which may be fabricated from a metal wool, is inserted in the fuel chamber 36 on the base plate. The pad absorbs liquid fuel 37 poured into the fuel chamber 36 from the open top of the container to prevent sloshing of the fuel in the container and aid in a controlled release of gases during the ignition of the charcoal.

Horizontally disposed above the base plate 34 is the screen 24 which may be fabricated from a wire mesh screen with its outer edges preened and turned downwardly to displace the screen from the bottom to a height approximately adjacent the top of the imperforate lower portion of the wall as shown in FIGS. 1 and 2.

The inconsumable ignition wick 26 is placed on the upper surface of the screen in a combustion chamber 38 formed by the apertured segment 16 of the wall of the container and the grate 28. The grate is horizontally mounted above and disposed from the screen at a level approximately adjacent the top of the apertured segment 16.

The grate 28 illustrated in FIG. 2 is formed with the edges molded down to rest on the screen. However, both the grate and the screen may alternately be formed flat and suspended in the container on pins extending from the side wall or welded in position. The grate is perforated, as illustrated in the drawing. The ignition wick 26 which rests on the screen 24 may be fabricated from a woven metallic fiber or other incombustible and fuel absorbing material. The wick is preferably shaped in a clover pattern as illustrated in FIGS.

1 and 3 for thorough ignition of combustible gases in the combustion chamber. The end of the wick designated 40, is extended through an aperture 42 in the wall of the container for lighting purposes as shown in FIG. 2. The wick becomes saturated with liquid fuel when the fuel is poured into the fuel chamber from the top of the container. The heat emitted from the initial wick ignition warms the top of the underlying pad releasing combustible gases into the combustion chamber. The liquid fuel which is initially poured to a level approximately equal to the top of the pad is continuously drawn to the top of the pad through capillary action in the pad until the charcoal 44 is fully ignited and the fuel exhausted.

Ventilation for the combustion process in the combustion chamber is provided by the comparatively large ventilation holes 18 in the apertured segment 16 of the wall of the container. The ignited gases in the combustion chamber rise upwardly through the grate 28 and into a chamber or receptacle 46 for the charcoal 44, as illustrated by the wavy lines in FIG. 2. The upper perforated portion 20 provides additional ventilation for the ignition of the contained charcoal.

Figure 3:
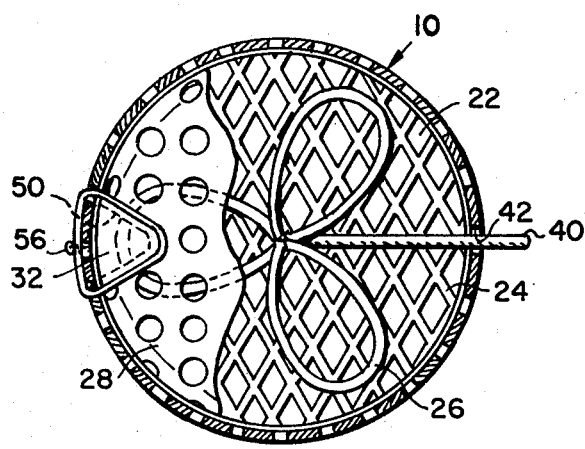
FIG. 3 is a sectional view taken on the lines 3—3 of FIG. 2.

Ignition of the upper reaches of charcoal is aided by the flame channel 32. This channel is fabricated from a longitudinal angle piece 50 with a plurality of perforations in its upper portion, designated 52, to permit the ignited gases to pass into the charcoal receptacle 46, as illustrated by the wavy lines leading therefrom in FIG. 2. The angle piece 50 is mounted against an imperforate section 54 of the wall of the container and fastened by two wire ties 56, as shown in FIGS. 1 and 3, such that the lower end is positioned immediately above the grate as shown in FIG. 2, and the upper end terminates approximately at the top of the cylindrical wall.

Accordingly,

I claim:

1. A portable charcoal igniter comprising a container with an open top, a closed bottom and generally vertical side walls, said walls having an imperforate lower portion, an apertured intermediate segment and a generally perforated upper portion, wherein said container includes in combination:
   a. a fuel chamber containing a fuel absorbing pad, said chamber being formed by the closed bottom and the imperforate lower portion of the vertical side walls;
   b. a combustion chamber above the fuel chamber, said combustion chamber having an ignition wick supported immediately adjacent the fuel absorbing pad, and a grate mounted above the ignition wick adjacent the top of the apertured segment of the side walls, and;
   c. a charcoal receptacle above the grate wherein charcoal may be contained by the generally perforated upper portion of the side walls.

2. The portable charcoal igniter of claim 1 further comprising a flame channel extending from the grate to approximately the top of a side wall, said flame channel having perforations through which ignited gases pass to the upper reaches of the charcoal receptacle.

3. A portable charcoal ignited comprising:
   a. a container with an open top, a closed bottom and a vertically disposed tubular side wall said side wall having an imperforate lower portion, an apertured intermediate segment and a generally perforated upper portion;
   b. a screen mounted horizontally above and displaced from the closed bottom; said screen in combination with the bottom and the imperforate lower portion of the said wall, defining a liquid fuel chamber;
   c. a fuel absorbing pad supported on the closed bottom in the fuel chamber;
   d. an incomsumable ignition wick supported on the screen, said wick extending through an aperture in the vertical wall;
   e. a grate mounted horizontally above and disposed from the screen; said grate, in combination with the screen and the apertured segment of the vertical wall, defining a combustion chamber;
   f. a charcoal receptacle defined by the grate and generally perforated upper portion of the vertical wall.

4. The portable charcoal igniter of claim 3 further comprising a flame channel formed by a longitudinal tube with a perforated upper portion, said tube being mounted to the tubular side wall immediately above the grate.

5. The portable charcoal igniter of claim 3 further comprising a handle fixed to the tubular side wall and extending therefrom for transporting the charcoal igniter.

6. A portable charcoal igniter comprising in combination:
   a. a tubular container having an open top, a bottom base plate and a vertical side wall, said wall having an imperforate lower portion, an apertured intermediate segment and a generally perforated upper portion;
   b. a fuel absorbing pad supported on the bottom base plate;
   c. a screen mounted horizontally above the bottom base plate adjacent the top of the imperforate lower portion of the side wall;
   d. an inconsumable ignition wick supported on the screen, said wick extending through an aperture in the side wall;
   e. a grate mounted horizontally above the screen adjacent the top of the apertured segment of the side wall;
   f. a longitudinal perforated flame channel mounted to the side wall above the grate.

7. The portable charcoal igniter of claim 6 further comprising a handle extending from the side wall of the container.

8. The portable charcoal igniter of claim 6 wherein the inconsumable ignition wick is formed is a cloverleaf pattern on the screen.

9. The portable charcoal igniter of claim 6 wherein the flame channel is mounted to an imperforate section of the generally perforated upper portion of the side wall.

* * * * *